P. G. ZIMMERMANN.
AEROPLANE CONTROL.
APPLICATION FILED MAY 14, 1920.

1,375,199.

Patented Apr. 19, 1921.
5 SHEETS—SHEET 1.

INVENTOR
Paul G. Zimmermann
BY
ATTORNEY

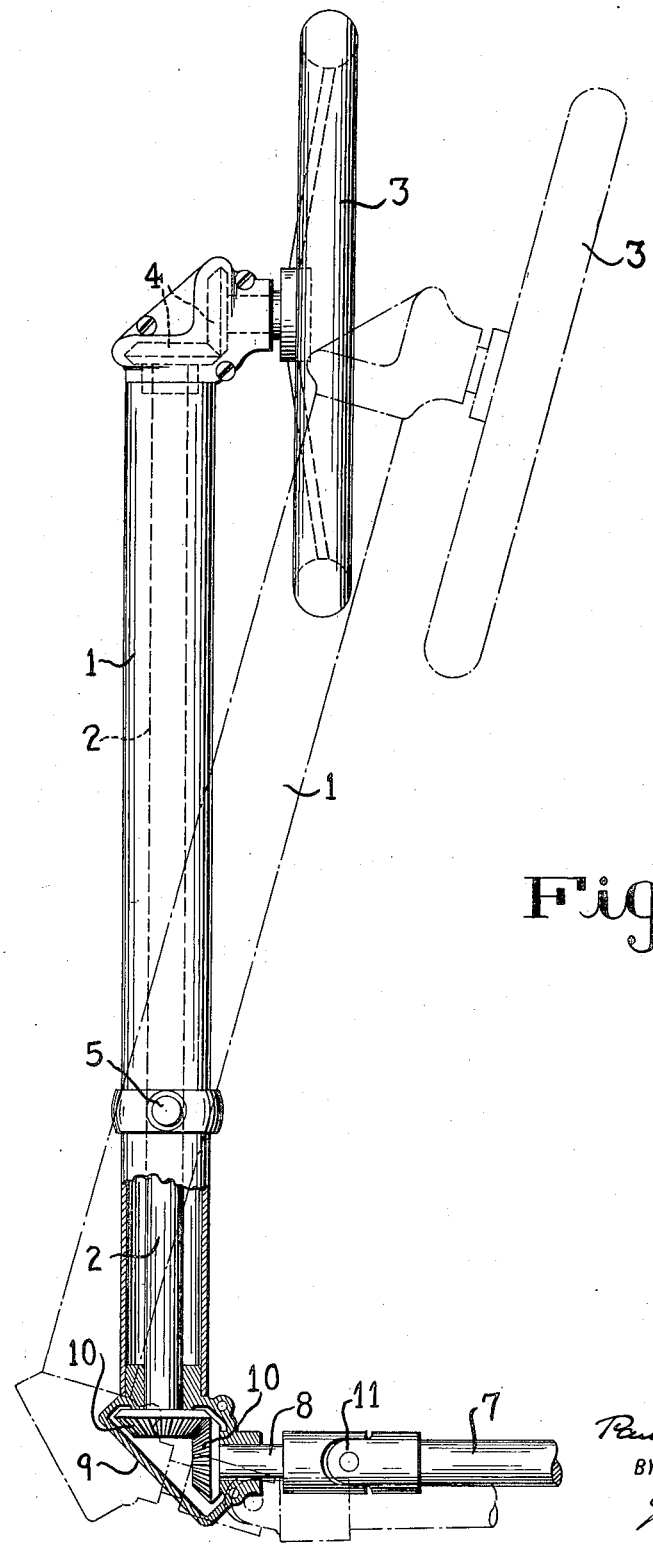

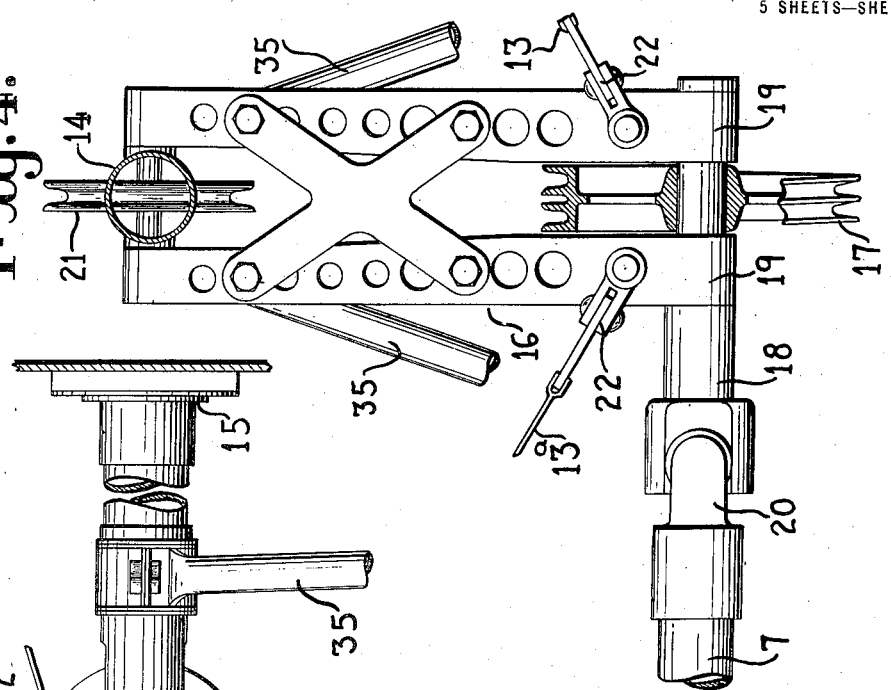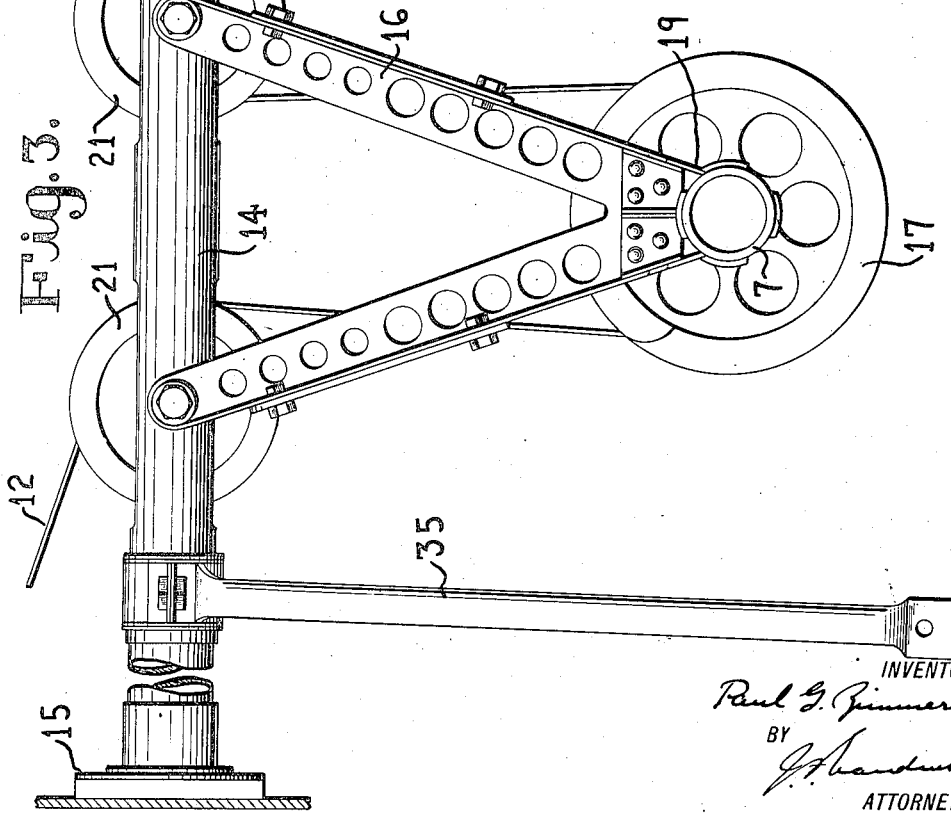

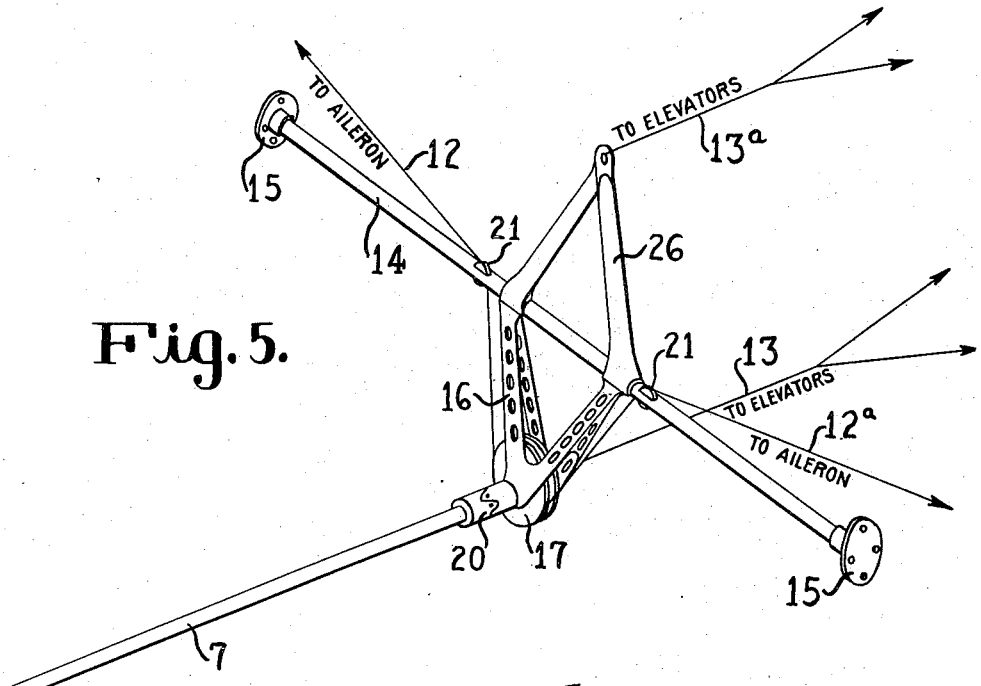
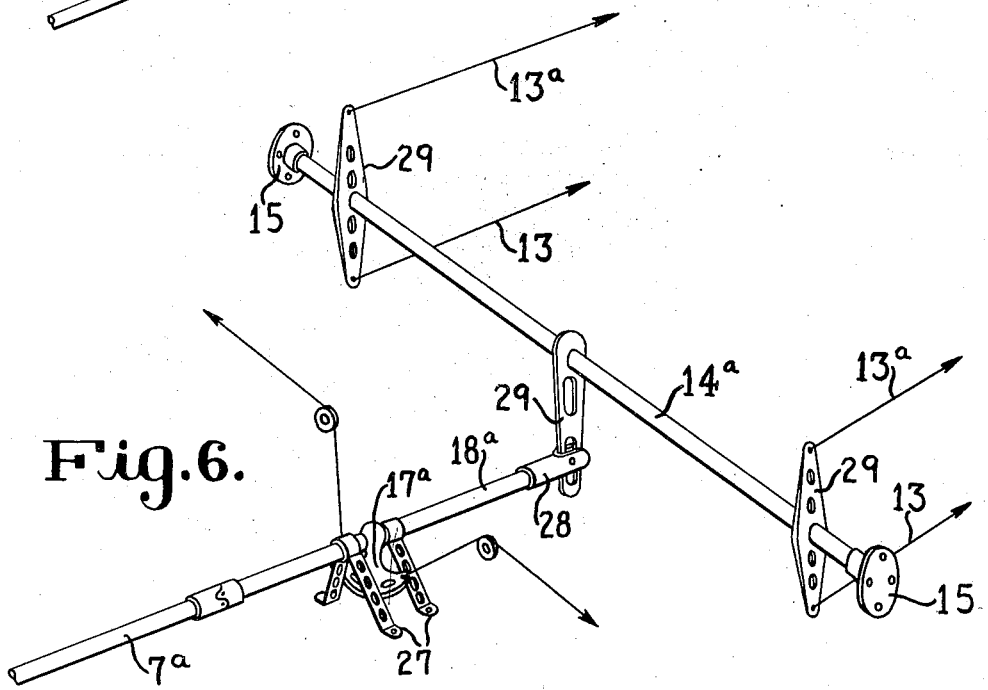

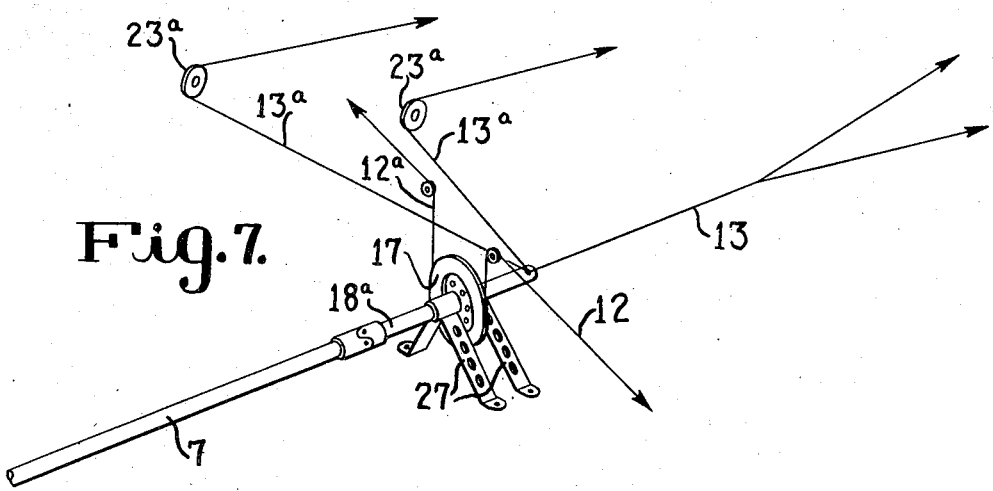
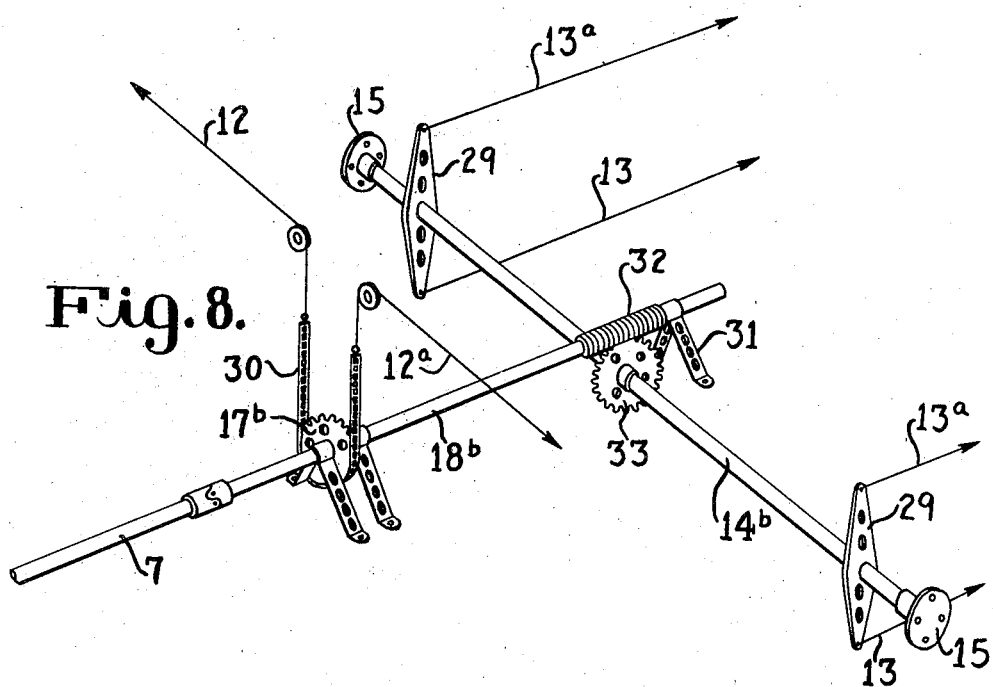

UNITED STATES PATENT OFFICE.

PAUL G. ZIMMERMANN, OF KEYPORT, NEW JERSEY, ASSIGNOR TO AEROMARINE PLANE & MOTOR COMPANY, OF NEW YORK, N. Y., A CORPORATION OF NEW YORK.

AEROPLANE CONTROL.

1,375,199. Specification of Letters Patent. Patented Apr. 19, 1921.

Application filed May 14, 1920. Serial No. 381,276.

*To all whom it may concern:*

Be it known that I, PAUL G. ZIMMERMANN, a citizen of the United States, and a resident of Keyport, in the county of Monmouth and State of New Jersey, have invented new and useful Improvements in Aeroplane Controls, of which the following is a specification.

This invention relates to controls for flying-machines, and more particularly for flying-boats; and the object is to provide an improved and simplified control. An important advantage, among others, is the removal of control wires and parts likely to be fouled from the cockpit. The mechanism involves a fore-and-aft shaft, capable of both rotational and translational movements. At the forward end of this shaft is operating means in the form of a rocking column, with an operating wheel and an internal shaft geared at its lower part to the fore-and-aft shaft. From the rear part of this two-movement shaft connections are taken off to the ailerons or equivalent surfaces and to the elevators or their equivalents, whereby the ailerons are operated through rotational movement of the shaft upon turning the control wheel while the elevators are operated through the translational movement of the shaft by the pilot pushing or pulling upon the wheel. Other and more detailed features of the invention will become apparent as the specification proceeds. Certain preferred embodiments are herein illustrated and described, and it will be understood that there may be numerous other modifications.

In the accompanying drawings forming a part hereof:

Fig. 2 is a side elevation of the control column with the forward part of the fore-and-aft shaft connected thereto, the lower part of the column being in vertical section, and a changed position being indicated in broken lines;

Fig. 3 is a front elevation of an oscillatory part at the rear end of the fore-and-aft shaft, with its axle broken away and shortened and a bracket also broken away;

Fig. 4 is a side elevation of Fig. 3, with parts in section, and showing also the rear part of the shaft;

Figs. 5 to 8 are semi-diagrammatic views of alternative forms.

Figure 1:
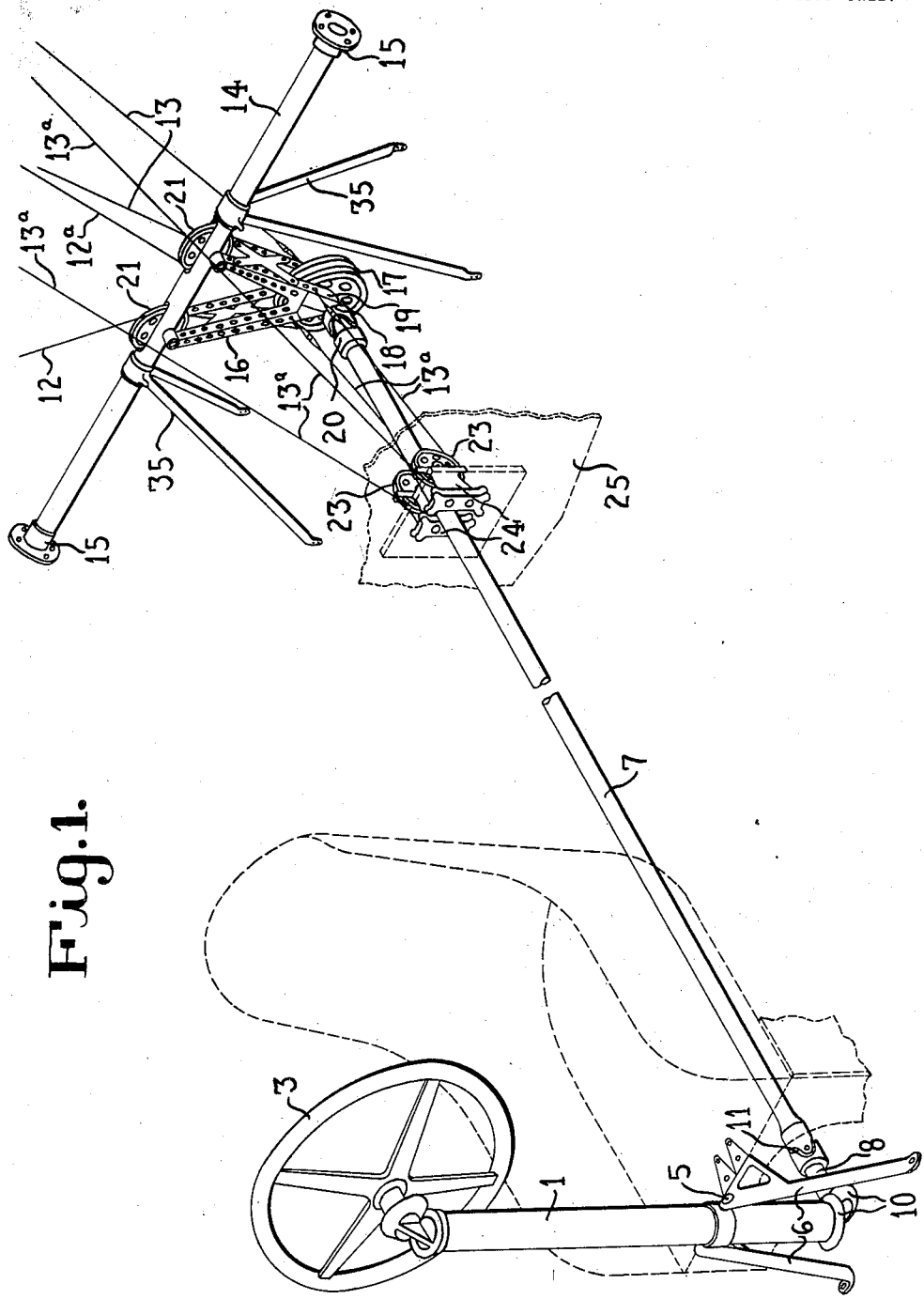
Figure 1 is a perspective view of the control, with the two-movement fore and aft shaft broken away and shortened for economy of space, and the wires leading to the elevators and ailerons shown vanishing.

In the forward part of the cockpit of the machine is an upright control column 1 containing a rotatable shaft 2. A control wheel 3 is mounted rotatably on the upper end of the column and connected by bevel gears 4 with the shaft 2. The column is pivotally supported intermediate its ends and nearer the lower end, so as to be capable of rocking forward and backward upon a transverse axis. For this purpose the column is shown provided with oppositely projecting trunnions 5, which are received in bearings in fixed brackets 6.

From the lower end of the column 1 a fore-and-aft shaft 7 extends rearward to a point behind the usual location of the gasolene tanks. Said shaft includes a short front section 8, which is journaled for rotary movement and held against longitudinal movement in the bottom casing 9 of the column, and geared to the lower end of the shaft 2 by bevel gears 10. The shaft section 8 is connected to the body of the shaft 7 by a universal driving joint 11.

It will be understood, therefore, that the two-movement shaft 7 can be turned by turning the wheel 3 or given a translational movement by pushing or pulling upon the wheel so as to rock the column. These two movements of the shaft are utilized to operate, respectively, aileron wires 12, 12$^a$ and elevator wires 13, 13$^a$, which have connection, direct or indirect, with the rear part of the shaft. The manner of effecting these connections may be varied.

In the construction illustrated in Figs. 1 to 4 the shaft 7 connects at the rear with a part adapted to oscillate upon a transverse axis. In this particular instance said part comprises a transverse axle 14 journaled at its opposite ends in sockets 15 fixed to the sides of the body and at intermediate points in bearings on brackets 35, and a depending generally V-shaped hanger 16 fixed to the middle of the axle. Said hanger is desirably bifurcated transversely; and at its lower end, between its front and rear portions, is held a drum 17 constituting a form of rotary member for actuating the aileron wires 12, 12$^a$, which are applied thereto. The drum 17 is fixed to a rear shaft section 18 journaled in bearings 19 in the hanger and connected by a universal driving joint 20 with the rear end of the body of the shaft 7. The aileron wires pass upward to direction-changing guide pulleys 21 mounted in slots in the axle 14 constituting the pivotal portion of the oscillatory part. It follows from the foregoing that the fore-and-aft shaft is connected with the oscillatory part, so as to be capable of turning freely relatively thereto and of swinging the same by its translational movement. The rotational movement turns the drum 17 so as to pull on one of the aileron wires and let off on the other, or vice versa, and by reason of the mounting of the drum 17 and pulleys 21 in the hanger the fore-and-aft movement does not produce binding or cause slack in these wires. Connections between the wires 12 and 12$^a$ and the ailerons have not been illustrated, as such matters are well understood.

A pair of elevator wires 13 are connected by swiveled clips 22 to the rear part of the oscillatory hanger 19, and pass rearward to the upper horns of the elevators (not shown). The other pair of elevator wires 13$^a$ are connected by similar clips 22 with the forward part of the hanger and pass for a short distance forward to and around direction-changing guide pulleys 23 mounted in brackets 24 on a bulkhead 25. From these pulleys the said wires extend rearward to the lower horns of the elevators. Consequently forward movement of the shaft 7 swings the hanger so as to pull on the elevator wires 13 and pay out the wires 13$^a$, the reverse being accomplished by rearward movement of said shaft, and the elevators being caused in this manner to tilt upward or downward, as the case may be.

The form illustrated in Fig. 5 is similar to the one just described, but eliminates the direction-changing pulleys 23 and the forward pass of the elevator wires 13$^a$, which instead are secured to and extend rearward from an arm 26 of the oscillatory part, projecting above the axle 14. The wires 13, 13$^a$ are illustrated as single wires, branching each into two.

Fig. 6 shows a construction in which the fore-and-aft two-movement shaft 7$^a$ has a rear section 18$^a$, which slides through fixed bearings in stationary brackets 27 and has a sliding key and keyway connection with a rotatable aileron-wire actuating member 17$^a$ confined between these brackets. The member 17$^a$ may be sector, as shown. The rear end of the sliding shaft section 18$^a$ is swiveled in a fork 28, which engages an arm 29 projecting downward from the center of a rock axle 14$^a$. Double arms 29 on the axle at opposite sides of the center receive the ends of the elevator wires 13, 13$^a$.

In Fig. 7, there is a sliding shaft section 18$^a$, as in the last form, keyed to an aileron-wire drum 17 held against longitudinal movement by brackets 27. The elevator wires 13, 13$^a$, however, are connected directly to the rear end of the shaft section 18$^a$. The wires 13$^a$ pass forward around a direction-changing pulley or pulleys 23$^a$ and thence rearward, substantially as in the first form.

Fig. 8 also has a rear sliding shaft section 18$^b$ which passes in keyed engagement through a rotatable aileron-wire actuating member 17$^b$. The view illustrates the fact that said member may be a sprocket wheel, engaged by a chain 30, to which the ends of the aileron wires are secured. The rear end of the shaft section 18$^b$ is guided in another fixed bracket 31, and in front of said bracket has rack teeth 32, which may be extended circularly around it so as to avoid the necessity for a swivel joint, said rack-teeth meshing with a toothed wheel 33 fast on the center of a transverse rock axle 14$^b$ bearing double arms 29 for the elevator wires, as in Fig. 6. Thus, in a different manner, an operative connection is secured between the fore-and-aft two-movement shaft and a rear part rotatable or oscillatable on a transverse axis, to which the elevator wires are connected.

What I claim as new is:

1. A flying-machine control comprising a control column pivotally supported to rock fore and aft and containing a rotatable shaft with an operating wheel at the top, a fore-and-aft longitudinally movable and rotatable shaft connected with the lower part of the column and geared to the shaft therein, and aileron and elevator connections connected with the rear part of said fore-and-aft shaft to be operated, respectively, by the rotary and translation movements.

2. A flying-machine control comprising a control column pivotally supported to rock fore and aft and containing a rotatable shaft with an operating wheel at the top, a fore-and-aft longitudinally movable and rotatable shaft connected with the lower part of the column and geared to the shaft therein, a part oscillatory on a transverse axis to which the rear end of the fore-and-aft shaft is connected so as to turn freely relatively thereto and to swing the same by its translational movement, an aileron-wire actuating member carried by said oscillatory part and connected with said shaft so as to be operated by the turning movement thereof, aileron-wire direction-changing guides at the pivotal region of the oscillatory part, and means whereby the translational movement of the fore-and-aft shaft controls the elevators.

3. In a flying-machine control, the combination of a fore-and-aft control shaft capable of both rotational and translational movements, a hanger suspended on a transverse axis at the rear of said shaft, an aileron-wire drum carried by said hanger and connected with said shaft by a universal driving joint, aileron-wire direction-changing guides at the pivotal region of the hanger, and means whereby the translational movement of the shaft controls the elevators.

4. In a flying-machine control, the combination of a fore-and-aft control shaft capable of both rotational and translational movements, a hanger suspended on a transverse axis at the rear of said shaft, an aileron-wire drum carried by said hanger and connected with said shaft by a universal driving joint, aileron-wire direction-changing guides at the pivotal region of the hanger, elevator-wires connected with the hanger and leading forward and rearward therefrom, and direction-changing guides about which the forward-extending wires turn and pass rearward.

5. In a flying-machine control, the combination of a fore-and-aft shaft capable of both rotational and translational movements, a part oscillatory on a transverse axis to which the rear end of said shaft is connected so as to turn freely relatively thereto and to swing the same by its translational movement, aileron-wire actuating and direction-changing members carried by said part, the former having flexible rotational driving connection with the shaft, and elevator-wires connected with said oscillatory parts so as to be operated by the translational movement of the shaft.

6. In a flying-machine control, the combination of a fore-and-aft shaft capable of both rotational and translational movements, aileron-wires having connection with the rear part of said shaft so as to be operated by rotational movement thereof, elevator-wires having connection with the rear part of the shaft and extending respectively rearward and forward, and direction-changing guides about which the forwardly-extending elevator-wires turn and pass rearward.

7. In a flying-machine, the combination of a fore-and-aft shaft capable of both rotational and translational movements extending rearward from the operator's place, operating means at the front of the shaft, and two control connections taken from the rear of the shaft operated by the rotational and translational movements thereof, respectively.

8. In a flying-machine, the combination of a fore-and-aft shaft capable of both rotational and translational movement extending rearward from the operator's place, means whereby the rotational movement is utilized to control the ailerons, a rear part mounted to turn on a transverse axis, to which the elevator-wires are connected, and a connection between said shaft and part whereby the translational movement of the shaft controls the elevators.

9. In a flying-machine control, the combination of a control column pivotally supported to rock fore and aft and containing a rotatable shaft with an operating wheel at the top, a fore-and-aft longitudinally movable and rotatable shaft connected with the lower part of the column and geared to the shaft therein, and two control connections taken from said shaft operated, respectively, by the rotary and translational movements thereof.

10. A flying-machine control, the combination of a control column pivotally supported to rock fore and aft, a rotatable shaft passing through the column, an operating wheel on the upper end of the column, gears operatively connecting said wheel and shaft, a stub section of a fore-and-aft shaft carried by and rotatable in the lower part of the column, gears operatively connecting said stub shaft section and the lower end of the shaft in the column, a main fore-and-aft shaft section, a universal joint connecting the front end of the same and the stub-shaft section, a rear-end section, a second universal joint connecting said rear-end section with the main fore-and-aft shaft section, and two control connections taken from said rear-end section operated, respectively, by the rotary and translational movements of the fore-and-aft shaft.

PAUL G. ZIMMERMANN.